United States Patent
Ishibashi et al.

(10) Patent No.: US 8,947,582 B2
(45) Date of Patent: Feb. 3, 2015

(54) DIGITAL PHOTOGRAPHING APPARATUS AND METHOD OF CONTROLLING THE SAME

(75) Inventors: Kenji Ishibashi, Suwon-si (KR); Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 13/290,310

(22) Filed: Nov. 7, 2011

(65) Prior Publication Data

US 2012/0320255 A1  Dec. 20, 2012

(30) Foreign Application Priority Data

Jun. 14, 2011 (KR) .................. 10-2011-0057601

(51) Int. Cl.
*H04N 5/232* (2006.01)
*G03B 17/14* (2006.01)

(52) U.S. Cl.
CPC ............ *G03B 17/14* (2013.01); *H04N 5/23209* (2013.01); *H04N 5/23241* (2013.01); *H04N 5/23296* (2013.01); *G03B 2205/0046* (2013.01)
USPC .................. 348/347; 348/372; 348/240.99

(58) Field of Classification Search
None
See application file for complete search history.

(56) References Cited

U.S. PATENT DOCUMENTS

| | | | | |
|---|---|---|---|---|
| 5,028,773 A | * | 7/1991 | Hata | ...................... 250/201.2 |
| 5,196,880 A | * | 3/1993 | Ishibashi et al. | ............. 396/78 |
| 5,305,049 A | * | 4/1994 | Miyazaki et al. | ............. 396/63 |
| 5,404,191 A | * | 4/1995 | Kashiyama et al. | ............ 396/85 |
| 5,557,365 A | * | 9/1996 | Ohsawa | .................. 396/279 |
| 5,664,234 A | | 9/1997 | Kawasaki et al. | |
| 5,697,000 A | * | 12/1997 | Hara et al. | ................ 396/77 |
| 6,710,809 B1 | * | 3/2004 | Niikawa | ................. 348/372 |
| 7,652,715 B2 | * | 1/2010 | Kitajima et al. | ............. 348/347 |
| 2002/0196359 A1 | * | 12/2002 | Yoo | ............................. 348/363 |
| 2009/0285572 A1 | * | 11/2009 | Shibuno et al. | ............... 396/133 |
| 2012/0320256 A1 | * | 12/2012 | Ishibashi | ..................... 348/347 |

FOREIGN PATENT DOCUMENTS

| | | |
|---|---|---|
| JP | 05-203868 A | 8/1993 |
| JP | 05-313053 A | 11/1993 |
| JP | 06-160693 A | 6/1994 |
| JP | 2794631 B2 | 9/1998 |
| JP | 2000-147361 A | 5/2000 |
| JP | 2002-131616 A | 5/2002 |
| JP | 2009-205180 A | 9/2009 |

* cited by examiner

*Primary Examiner* — Twyler Haskins
*Assistant Examiner* — Wesley J Chiu
(74) *Attorney, Agent, or Firm* — Drinker Biddle & Reath LLP

(57) ABSTRACT

A digital photographing apparatus and a method of controlling the same. The digital photographing apparatus includes a body unit and an exchangeable lens installed to the body unit, wherein the exchangeable lens includes: a power zoom performer for performing a power zoom operation; and an iris for adjusting an amount light penetrating through an imaging lens, the body unit includes: an image pickup device for generating an image signal by capturing the light; a shutter for controlling light exposure of the image pickup device; and a release controller for controlling operations of the shutter and the iris, and the power zoom operation is prohibited when the release controller starts to drive the shutter or the iris. Accordingly, the power zoom operation is stably controlled.

14 Claims, 17 Drawing Sheets

FIG. 11

| Focus Speed | |
|---|---|
| FS1 | 2000 |
| FS2 | 2500 |
| FS3 | 3000 |
| FS4 | 3500 |
| FS5 | 4000 |
| FS6 | 4500 |
| FS7 | 5000 |
| FS8 | 5500 |
| FS9 | 6000 |
| FS10 | 6500 |

| Focus Sensitivity | |
|---|---|
| Z1 | 0.16 |
| Z2 | 0.15 |
| Z3 | 0.14 |
| Z4 | 0.13 |
| Z5 | 0.12 |
| Z6 | 0.11 |
| Z7 | 0.10 |
| Z8 | 0.09 |

| Backlash | |
|---|---|
| BL | 30 |

| Actuator | |
|---|---|
| DC | 0 |
| Step | 1 |
| US | 0 |
| VC | 0 |

| Lens Power | |
|---|---|
| Lens Power | 0 |

| Open Iris | |
|---|---|
| Z1 | 2.82 |
| Z2 | 2.9 |
| Z3 | 2.98 |
| Z4 | 3.06 |
| Z5 | 3.16 |
| Z6 | 3.26 |
| Z7 | 3.36 |
| Z8 | 3.5 |

| Focus Length | |
|---|---|
| Z1 | 28.0 |
| Z2 | 33.8 |
| Z3 | 40.9 |
| Z4 | 49.4 |
| Z5 | 59.6 |
| Z6 | 72.0 |
| Z7 | 87.0 |
| Z8 | 105.1 |

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2011-0057601, filed on Jun. 14, 2011, in the Korean Intellectual Property Office, the disclosure of which is incorporated herein in its entirety by reference.

BACKGROUND

The present invention relates to a digital photographing apparatus and a method of controlling the same.

Digital photographing apparatuses, such as cameras, camcorders, etc., may perform a zoom operation to enlarge a distant subject, and may adjust a focus to capture a clear sill image or moving image. Also, the digital photographing apparatuses may drive a zoom lens, a focus lens, an iris, a shutter, etc., to perform various functions, and require a predetermined power to drive each element.

SUMMARY OF THE INVENTION

The present invention provides a digital photographing apparatus capable of controlling a stable power zoom operation, and a method of controlling the same.

According to an embodiment of the present invention, there is provided a digital photographing apparatus including a body unit and an exchangeable lens installed to the body unit, wherein the exchangeable lens includes: a power zoom performer for performing a power zoom operation; and an iris for adjusting an amount light penetrating through an imaging lens, the body unit includes: an image pickup device for generating an image signal by capturing the light; a shutter for controlling light exposure of the image pickup device; and a release controller for controlling operations of the shutter and the iris, and the power zoom operation is prohibited when the release controller starts to drive the shutter or the iris.

The release controller may be configured to prohibit the performing of the power zoom operation for a predetermined time after the shutter or the iris starts to be driven.

The exchangeable lens may further include a compensator for performing varifocal compensation to compensate for a focal length change according to the power zoom operation, wherein the compensator may be configured to perform the varifocal compensation even when the performing of the power zoom operation is prohibited by the release controller.

The exchangeable lens may further include: a lens storage unit for storing power consumption information; and a communicator for transmitting the power consumption information to the body unit, and the release controller may be configured to prohibit the performing of the power zoom operation if the power consumption information is equal to or above a reference value.

The exchangeable lens may further include: a lens storage unit for storing power consumption information; and a communicator for transmitting the power consumption information to the body unit, wherein the release controller may be configured not to prohibit the performing of the power zoom operation if the power consumption information is below a reference value.

The power zoom performer may be configured to stop the power zoom operation if the release controller starts to drive the shutter or the iris while the power zoom performer is performing the power zoom operation.

The exchangeable lens may further include a compensator for performing varifocal compensation to compensate for a focal length change according to the power zoom operation, and the compensator may be configured to stop an operation after performing the varifocal compensation until a point of time when the power zoom operation is stopped when the performing of the power zoom operation is prohibited by the release controller.

The driving of the shutter may include at least one of shutting the shutter and opening the shutter.

According to another embodiment of the present invention, there is provided a method of controlling a digital photographing apparatus for performing a power zoom operation according to manipulation by a user, the method including prohibiting the power zoom operation when a shutter or an iris starts to be driven.

The prohibiting may include prohibiting the power zoom operation for a predetermined time after the shutter or the iris starts to be driven.

The digital photographing apparatus may perform varifocal compensation to compensate for a focal length change according to the power zoom operation, and perform the varifocal compensation even when the performing of the power zoom operation is prohibited.

The digital photographing apparatus may include an exchangeable lens and a body unit installed with the exchangeable lens, wherein the exchangeable lens may transmit power consumption information to the body unit and the body unit may prohibit the performing of the power zoom operation if the power consumption information is equal to or above a reference value.

The digital photographing apparatus may include an exchangeable lens and a body unit installed with the exchangeable lens, wherein the exchangeable lens may transmit power consumption information to the body unit and the body unit may not prohibit the performing of the power zoom operation if the power consumption information is below a reference value.

The power zoom operation may be stopped if the shutter or the iris starts to be driven while the power zoom performer is performing the power zoom operation.

The digital photographing apparatus may perform varifocal compensation to compensate for a focal length change according to the power zoom operation, and stop an operation after performing the varifocal compensation until a point of time when the power zoom operation is stopped when the performing of the power zoom operation is prohibited.

The driving of the shutter may include at least one of shutting the shutter and opening the shutter.

BRIEF DESCRIPTION OF THE DRAWINGS

The above and other features and advantages of the present invention will become more apparent by describing in detail exemplary embodiments thereof below with reference to the attached drawings in which:

FIG. 11 is a collection of tables showing lens data according to an embodiment of the present invention;

DETAILED DESCRIPTION

Figure 1:
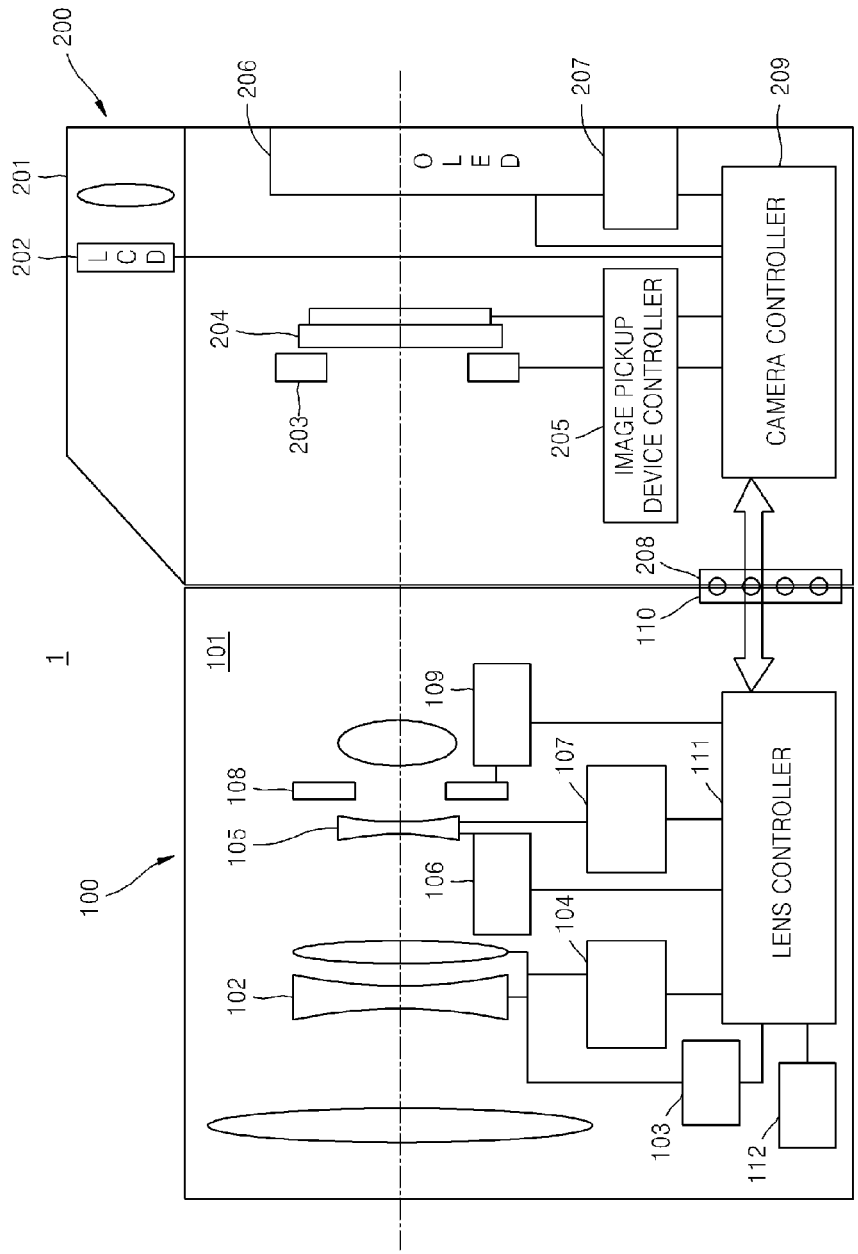
FIG. 1 is a pictorial block diagram of a digital photographing apparatus according to an embodiment of the present invention.

Hereinafter, the present invention will be described more fully with reference to the accompanying drawings, in which exemplary embodiments of the invention are shown and described below. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements. Also, while describing the various embodiments of the present invention below, detailed descriptions about related well-known functions or configurations that may diminish the clarity of the points of the present invention are omitted.

FIG. 1 is a pictorial block diagram of a digital photographing apparatus 1 according to an embodiment of the present invention.

Referring to FIG. 1, the digital photographing apparatus 1 according to the current embodiment includes an exchangeable lens (hereinafter, referred to as a lens) 100 and a body unit 200. The lens 100 has a focus detecting function and the body unit 200 has a function for driving a zoom lens 102 and a focus lens 105 by controlling the lens 100.

The lens 100 includes an image forming optical system 101, a zoom lens driving actuator 103, a zoom lens location detecting sensor 104, a focus lens driving actuator 106, a focus lens location detecting sensor 107, an iris driving actuator 109, a lens mount 110, a lens controller 111, and a lens manipulator 112.

The image forming optical system 101 includes the zoom lens 102 for adjusting a zoom, the focus lens 105 for changing a focus location, and an iris 108. The zoom lens 102 and the focus lens 105 may each be a lens group in which a plurality of lenses are combined.

The zoom lens location detecting sensor 104 and the focus lens location detecting sensor 107 respectively detect locations of the zoom lens 102 and the focus lens 105. A timing of detecting the location of the focus lens 105 may be set by the lens controller 111 or a camera controller 209 to be described later. For example, the timing of detecting the location of the focus lens 105 may be a timing of performing auto focus (AF) detection using an image signal.

The zoom lens driving actuator 103, the focus lens driving actuator 106, and the iris driving actuator 109 are controlled by the lens controller 110, and respectively drive the zoom lens 102, the focus lens 105, and the iris 108. Specifically, the focus lens driving actuator 106 drives the focus lens 105 in an optical axis direction.

The lens controller 111 controls overall operations of each element included in the lens 100. The lens controller 111 transmits information about the detected location of the focus lens 105 to the body unit 200. Here, the lens controller 111 may transmit the information about the detected location of the focus lens 105 to the body unit 200 when the location of the focus lens 105 is changed or when the camera controller 209 requests information about the location of the focus lens 105.

The lens controller 111 may perform a power zoom operation, an AF operation, and a varifocal compensation operation according to control of the body unit 200. In other words, the lens controller 111 may be an example of a power zoom performer and compensator. However, the power zoom performer and compensator is not defined by only the lens controller 111, and a plurality of elements may combine to perform functions of the power zoom performer and compensator.

Also, the lens controller 111 may include a storage unit for storing data, and the storage unit may store various pieces of information, such as lens data.

The lens mount 110 includes a lens communication pin, and is used as a transmission path for data, a control signal, or the like by being linked to a camera communication pin.

The lens manipulator 112 is a manipulator for performing a power zoom operation or a power focus operation. The lens manipulator 112 is connected to the lens controller 111 to apply a manipulator signal from a user to the lens controller 111.

A structure of the body unit 200 will now be described in detail.

The body unit 200 includes an electronic view finder (EVF) 201, a shutter 203, an image pickup device 204, an image pickup device controller 205, a display unit 206, a manipulation button 207, the camera controller 209, and a camera mount 208.

The EVF 201 may include a liquid crystal display unit 202, and a user may view an image being captured in real time via the EVF 201.

The shutter 203 determines a duration in which light is applied to the image pickup device 204, i.e., an exposure time.

The image pickup device 204 generates an image signal by capturing image light passed through the image forming optical system 101 of the lens 100. The image pickup device 204 may include a plurality of photoelectric transformation units arranged in a matrix form, and at least one of vertical and horizontal transmission paths for reading the generated image signal by transferring electric charges from the photoelectric transformation units. A charge coupled device (CCD) sensor, a complementary metal oxide semiconductor (CMOS) sensor, or the like may be used as the image pickup device 204.

The image pickup device controller 205 generates a timing signal, and controls the image pickup device 204 to capture an image in synchronization with the timing signal. Also, the image pickup device controller 205 sequentially reads horizontal image signals after accumulation of electric charges is completed in each of the scanning lines. The read horizontal image signals are used for the AF detection in the camera controller 209.

The display unit 206 displays various images and information. An organic light emitting display (OLED) or a liquid crystal display (LCD) may be used as the display unit 206.

The user inputs various commands to the manipulation button 207 to manipulate the digital photographing apparatus 1. The manipulation button 207 may include various buttons, such as a shutter release button, a main switch, a mode dial, and a menu button.

The camera controller 209 calculates a contrast value by performing the AF detection on the image signal generated by the image pickup device 204. Also, the camera controller 209 stores a contrast value at each of AF detecting points of time according to the timing signal generated by the image pickup device controller 205, and calculates the focus location by using the information about the focus lens 105 received from the lens 100 and the stored contrast value. The calculated focus location is transmitted to the lens 100.

The camera controller 209 may direct driving of the shutter 203, the iris 108, or the like according to a release start request from the manipulation button 207. In other words, the camera controller 209 may be an example of a release controller. However, the release controller is not limited to only the camera controller 209, and a plurality of elements may combine to perform functions of the release controller.

The camera mount 208 includes a camera communication pin. Also, power may be supplied to the lens controller 111 through the camera mount 208.

Schematic operations of the lens 100 and the body unit 200 will now be described.

When a subject is to be photographed, an operation of the digital photographing apparatus 1 starts by manipulating the main switch included in the manipulation button 207. The digital photographing apparatus 1 first displays a live view as follows.

Image light of the subject passes through the image forming optical system 101 and is incident on the image pickup device 204. At this time, the shutter 203 is in an open state. The incident image light is converted into an electric signal by the image pickup device 204, and thus an image signal is generated. The image pickup device 204 operates according to a timing signal generated by the image pickup device controller 205. The generated image signal is converted into data displayable by the camera controller 209, and is output to the EVF 201 and the display unit 206. Such an operation is called a live view display, and a live view image displayed according to the live view display is a moving image that is continuously displayed.

After the live view display, the digital photographing apparatus 1 starts an AF operation when the shutter release button, which is one of the manipulation button 207, is half-pressed. The AF operation is performed by using the image signal generated by the image pickup device 204. According to a contrast AF method, a focus location is calculated from a contrast value, and the lens 100 is driven based on the calculated focus location. The contrast value is calculated by the camera controller 209. The camera controller 209 calculates information for controlling the focus lens 105 from the contrast value, and transmits the calculated information to the lens controller 111 through the lens communication pin and the camera communication pin respectively included in the lens mount 110 and the camera mount 208.

The lens controller 111 performs the AF operation by driving the focus lens 105 in the optical axis direction by controlling the focus lens driving actuator 106 based on the received information. The location of the focus lens 105 is monitored by the focus lens location detecting sensor 107 and fed back to the camera controller 209.

When the zoom lens 102 is manipulated by the user to perform a zoom operation, the zoom lens location detecting sensor 104 detects the location of the zoom lens 102, and the lens controller 111 changes AF control parameters of the focus lens 105 to perform the AF operation again.

When a focus on the subject is adjusted through the above operations, the shutter release button is completely pressed and thus the digital photographing apparatus 1 performs light exposure. Here, the camera controller 209 first completely closes the shutter 203, and then transmits light measurement information obtained thus far to the lens controller 111 as iris control information. The lens controller 111 controls the iris driving actuator 109 based on the iris control information, and adjusts the iris 108 to have a suitable iris value. The camera controller 209 controls the shutter 203 based on the light measurement information, and captures an image of the subject by opening the shutter 203 for a suitable exposure time.

An image signal process and a compression process are performed on the captured image, and the processed image is stored in a memory card 212. At the same time, a captured image is output to the EVF 201 and the display unit 206, where the subject is displayed. Such a captured image is referred to as a quick view image.

Thus, the series of photographing operations are completed as described above.

Figure 2:
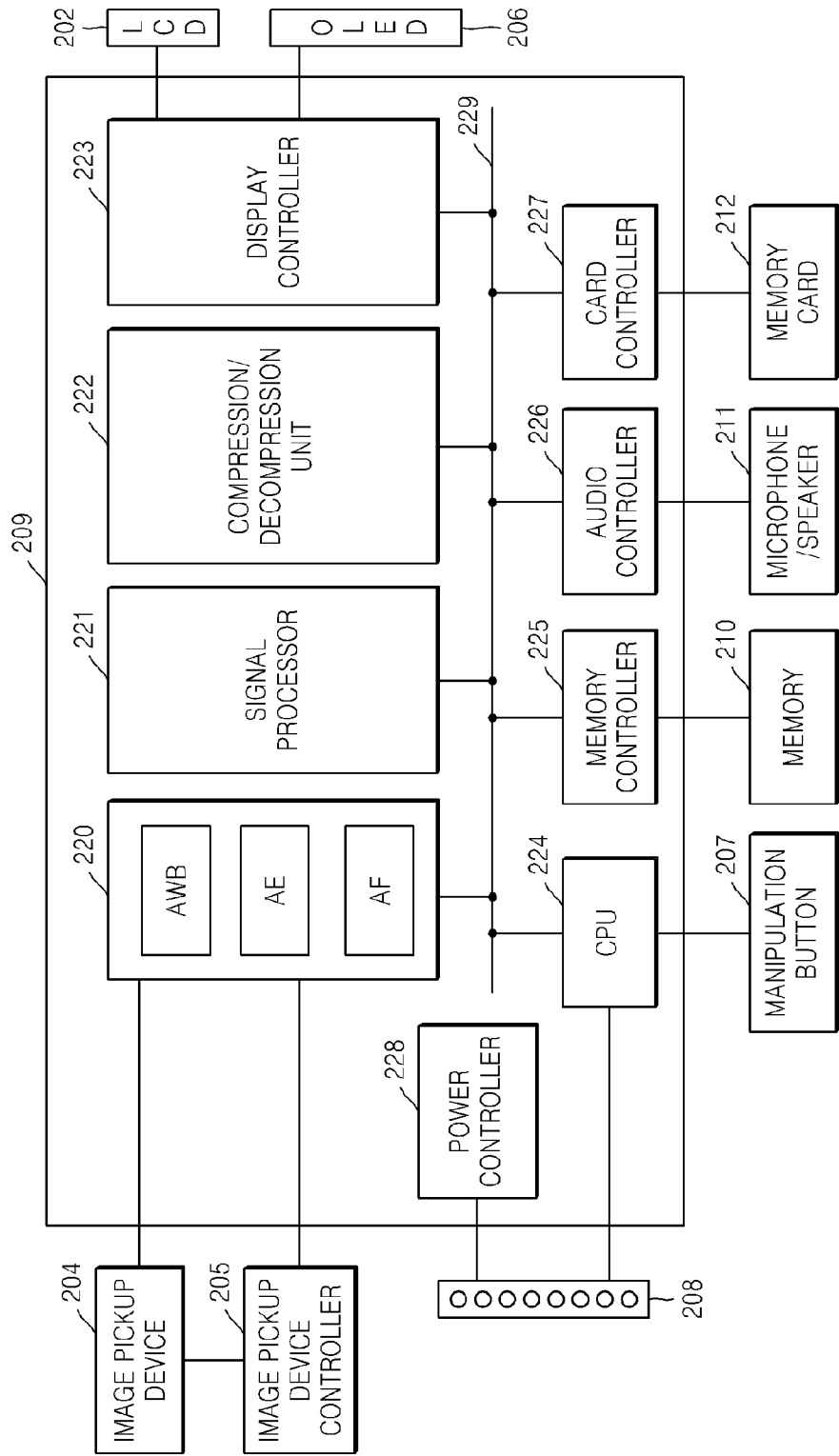
FIG. 2 is a block diagram of a camera controller of the digital photographing apparatus of FIG. 1.

FIG. 2 is a block diagram of the camera controller 209 of the digital photographing apparatus 1 of FIG. 1, according to an embodiment of the present invention.

Referring to FIG. 2, the camera controller 209 according to the current embodiment may include a pre-processor 220, a signal processor 221, a compression/decompression unit 222, a display controller 223, a central processing unit (CPU) 224, a memory controller 225, an audio controller 226, a card controller 227, a power controller 228, and a main bus 229.

The camera controller 209 transmits various directions and data to corresponding elements through the main bus 229.

The pre-processor 220 performs an auto white balance (AWB) operation, an auto exposure (AE) operation, and an AF operation by receiving an image signal generated by the image pickup device 204. In other words, a contrast value for adjusting a focus, an AE evaluation value for adjusting exposure, and an AWB evaluation value for adjusting white balance are calculated.

The signal processor 221 performs a series of image signal processes, such as gamma correction, on the image signal generated by the image pickup device 204 to prepare a live view image or a captured image displayable on the display unit 206.

The compression/decompression unit 222 performs compression and extension on the image signal on which the image signal processes have been performed. According to the compression, for example, an image signal is compressed in a compression format, such as a JPEG compression format or an H.264 compression format. An image file including image data generated via the compression is transmitted to and stored in the memory card 212.

The display controller 223 controls image output to a display screen, such as the liquid crystal display unit 202 of the EVF 201 or the display unit 206.

The CPU 224 controls overall operations of each element. Also, according to the digital photographing apparatus 1 of FIG. 1, the CPU 224 communicates with the lens 100.

The memory controller 225 controls a memory 210 for temporarily storing data, such as the captured image or image related information, and the audio controller 226 controls a microphone or speaker 211. Also, the card controller 227 controls the memory card 212 for storing the captured image.

The power controller 228 controls power consumption of the digital photographing apparatus 1 and power supply to the lens 100.

FIGS. 3A through 3D are graphs for describing an AF operation in a contrast AF method. In the contrast AF method, the AF operation is performed by detecting a location of a focus lens, where a contrast value of a subject is maximum, as a focus location. In FIGS. 3A through 3D, a horizontal axis denotes a location of a focus lens, and a vertical axis denotes a contrast value.

Figure 3A:
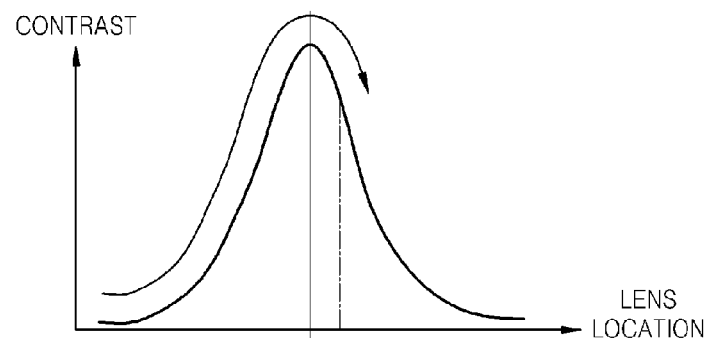
FIGS. 3A through 3D are graphs for describing an auto focus (AF) operation in a contrast AF method.

In FIG. 3A, a peak of a contrast value is detected by driving a focus lens in one direction at a high speed from a state where a contrast value is low as a subject is out of focus.

Figure 3B:
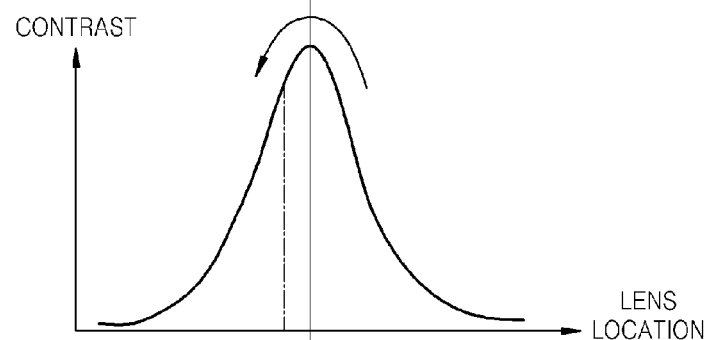

In FIG. 3B, the lens driving direction is reversed, and the peak is detected again by driving the focus lens at a low speed compared to the high speed of FIG. 3A. Accordingly, the AF operation may be performed precisely.

Figure 3C:
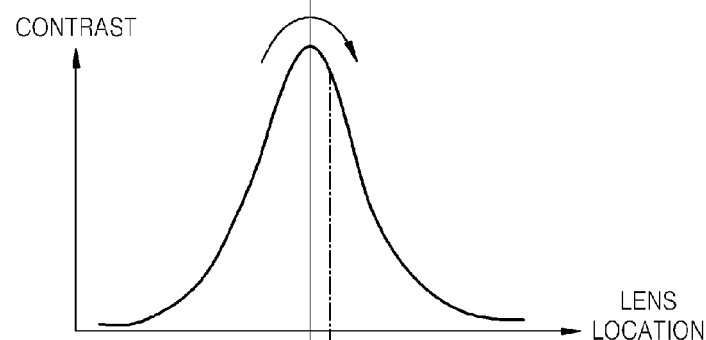

In FIG. 3C, the focus lens is driven toward a focus location according to the detected peak. However, a device for driving a lens generally has backlash, and an error may be generated in a lens location according to a driven direction. Accordingly, the focus lens is driven to pass through the focus location in FIG. 3C in order to allow for removal of the error.

Figure 3D:
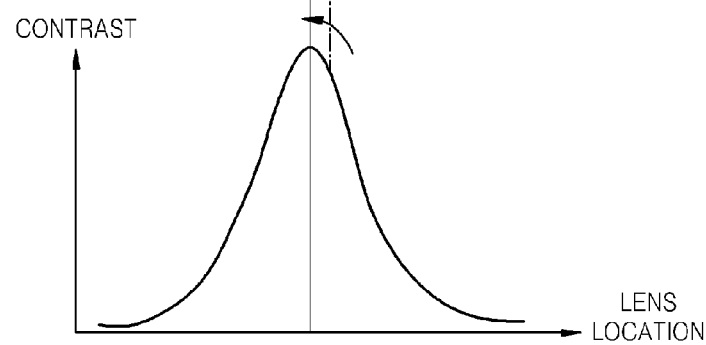

In FIG. 3D, the lens driving direction is again reversed and thus the focus lens is driven in the same direction as in FIG. 3B where the focus location is finally determined, and the focus lens is stopped at the focus location.

Thus, the AF operation is performed as described above.

An operation of photographing a subject according to the AF operation will now be described in detail.

Figure 4:
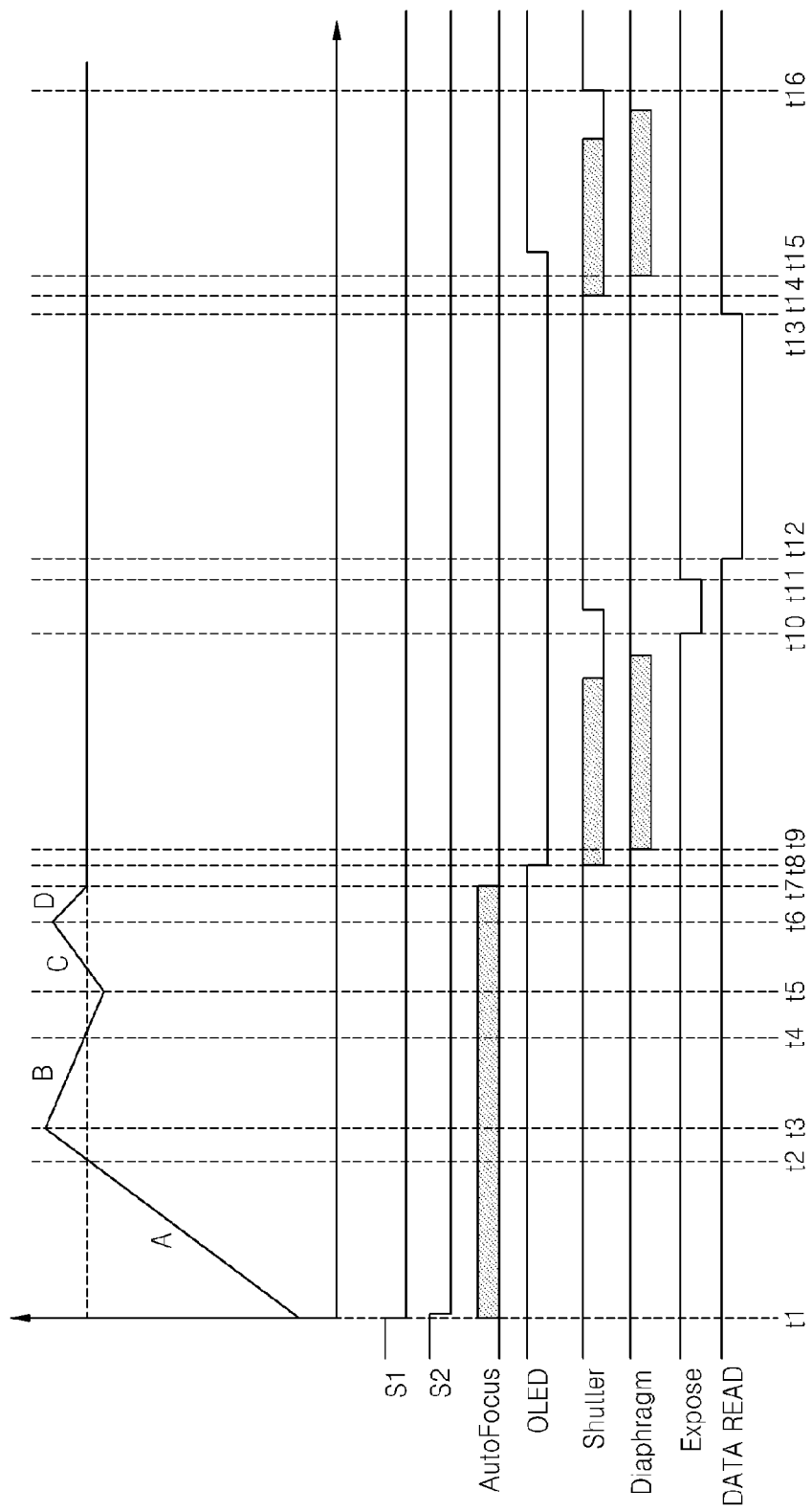
FIG. 4 is a timing diagram showing a general AF method.

FIG. 4 is a timing diagram showing a general AF method. In other words, FIG. 4 is a timing diagram showing a focus lens not being driven, i.e. the AF operation is not performed during a release operation.

In FIG. 4, a horizontal axis denotes time, and a vertical axis denotes a location of a focus lens. S1 and S2 respectively denote a photographing operation start signal and a release start signal received from a user. Auto Focus denotes a driven state of the focus lens, and the focus lens is driven in a gray portion. OLED denotes a state of the display unit 206. When the OLED is in a high level, an image of a subject is displayed on the display unit 206, and when the OLED is in a low level, a black screen is displayed on the display unit 206. Shutter denotes a driven state of a shutter driving actuator (not shown) for opening or shutting the shutter 203, and the shutter 203 is driven in gray portions. Also, a low level denotes a break state (pause state) and a high level denotes an off state. Diaphragm denotes a driven state of the iris 108, and the iris 108 is driven in gray portions. Expose denotes a timing when the subject image is exposed on the image pickup device 204, which begins when the shutter 203 is actually opened. Data Read denotes a timing when an image signal of the image pickup device 204 is recorded in a storage medium, while the Data Read is in a low level.

Referring to FIG. 4, the AF operation starts when S1 is applied according to manipulation by the user at a time t1. First, as described with reference to FIGS. 3A through 3D, an operation A for detecting a peak of a contrast value at a high speed is performed. Since a peak location needs to be passed to detect the peak of the contrast value at a time t2, a driven direction of a lens is reversed at a time t3 when the peak location is passed by a predetermined distance. Then an operation B for precisely detecting the peak location is performed. Similarly, the peak location is detected at a time t4, and the driven direction of the lens is reversed at a time t5 when the peak location is passed by a predetermined distance. At the time t5, a focus location is determined to be the peak location detected at the time t4. An operation C is performed toward the focus location, and an operation D is performed by reversing the driven direction of the lens again to correct a backlash at the time t6.

When a level of S2 is low at a time t7 when the operation D is completed (when the user requests a release), a release operation starts. First, the shutter 203 is driven at a time t8 from an opened state to a closed state by a shutter actuator (not shown). A direct current (DC) motor may be used to drive the shutter 203, and a high current flows when the DC motor starts to drive the shutter 203. Accordingly, at a time t9 after a predetermined time has passed after starting the driving of the shutter 203, for example, after 15 ms, the iris 108 starts to be driven. The iris 108 is driven by transmitting a command from the body unit 200 to the lens 100 through the communication pin of the lens mount 110. The shutter 203 is driven for a predetermined time, for example, 40 ms, and then enters into a break state (pause state). An iris value of the iris 108 changes according to luminance of the subject. However, the iris 108 is driven for a predetermined time, for example, within 70 ms.

After the driving of the shutter 203 and iris 108 is completed, a light exposure operation starts at a time t10. The shutter 203 is closed after a time set according to a set shutter speed, and thus the light exposure operation is completed at a time t11.

When the light exposure operation is completed, data is read from the image pickup device 204 at a time t12. When the data is completely read at a time t13 after a predetermined time, for example, after 110 ms, the shutter 203 starts to be driven at a time t14 to open the shutter 203 for the following photographing. Here, as described above, the iris 108 is driven to be opened at a time t16 after a predetermined time has passed, due to a driving current of the shutter actuator.

Figure 5:
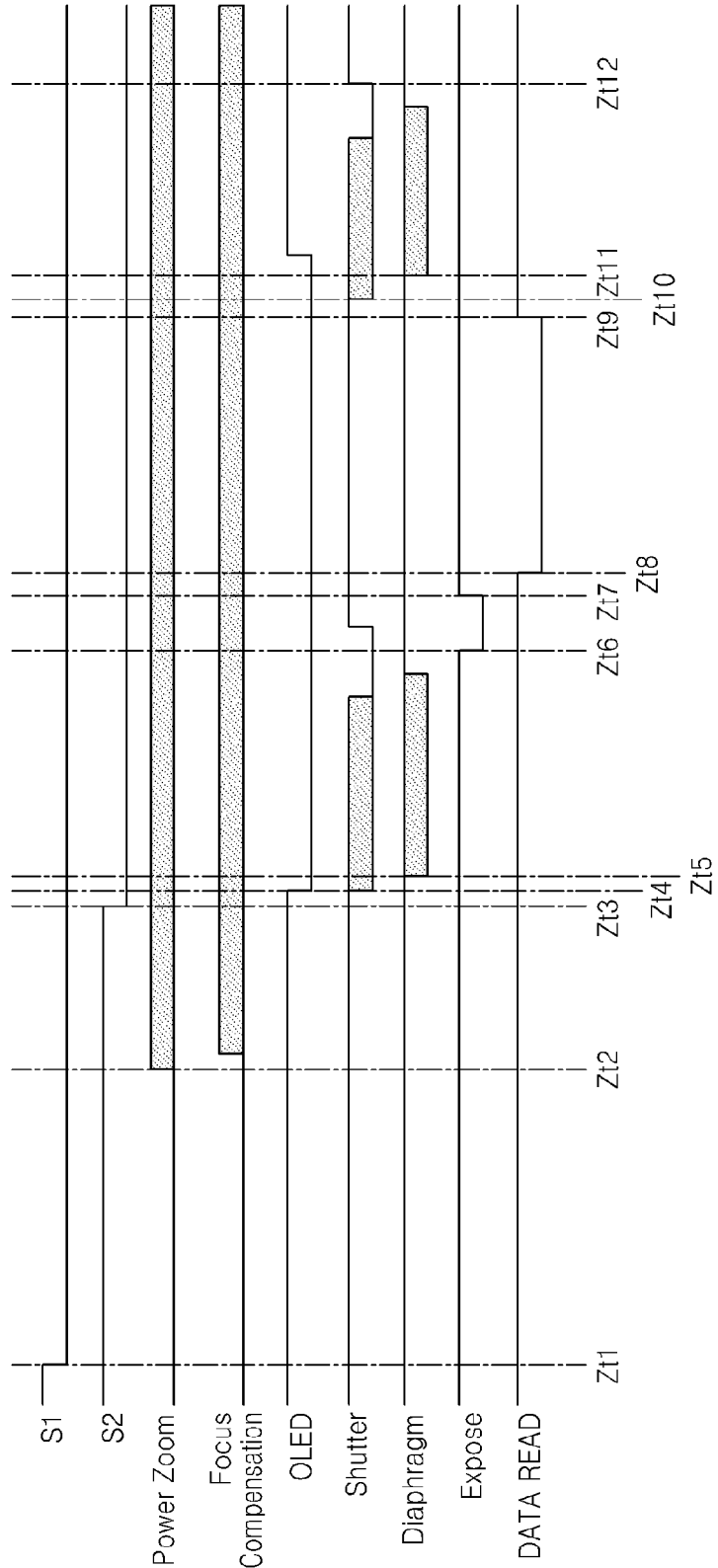
FIG. 5 is a timing diagram showing a method of performing a general power zoom operation.

FIG. 5 is a timing diagram showing a method of performing a general power zoom operation.

Referring to FIG. 5, Power Zoom denotes driving of the zoom lens driving actuator 103 according to a zoom manipulation by a user. Focus Compensation denotes a varifocal compensation operation for compensating for a focus location by changing a location of the focus lens 105 when the focus location is changed according to a zoom operation.

In FIG. 5, a power zoom operation is performed when there is spare power because power consumption of the power zoom operation is low, even while a release operation is being performed. When S1 is applied according to manipulation by the user, the digital photographing apparatus 1 starts to operate at a time Zt1. Then, an AF operation is performed. Details about the AF operation will be omitted herein, and it is assumed that the AF operation as described above with reference to FIGS. 3 and 4 is completed before a time Zt2.

Meanwhile, the power zoom operation is performed at the time Zt2 according to the zoom manipulation by the user. Also, the varifocal compensation operation for compensating for the location of the focus lens according to a zoom operation starts after a predetermined time has passed after the power zoom operation starts. The predetermined time may be 15 ms.

When S2 is in a low level at a time Zt3 according to a release operation request of the user, a shutter closing operation for closing the shutter 203 starts at a time Zt4, and the iris 108 starts to be driven at a time Zt5 after a predetermined time has passed after the time Zt4, for example, after 15 ms after the time Zt4.

When the driving of the shutter 203 and iris 108 is completed, light exposure starts at a time Zt6. When counting of a shutter speed is completed, the shutter 203 is closed to end the light exposure at a time Zt7, and data starts to be read at a time Zt8.

When the reading of the data is completed at a time Zt9, a shutter opening operation for opening the shutter 203 starts at a time Zt10, and the iris 108 is opened at a time Zt11 after a predetermined time, for example, 15 ms. When the driving of the shutter 203 and iris 108 is completed at a time Zt12, a following photographing operation is performed.

As such, the general power zoom operation is performed.

Figure 6:
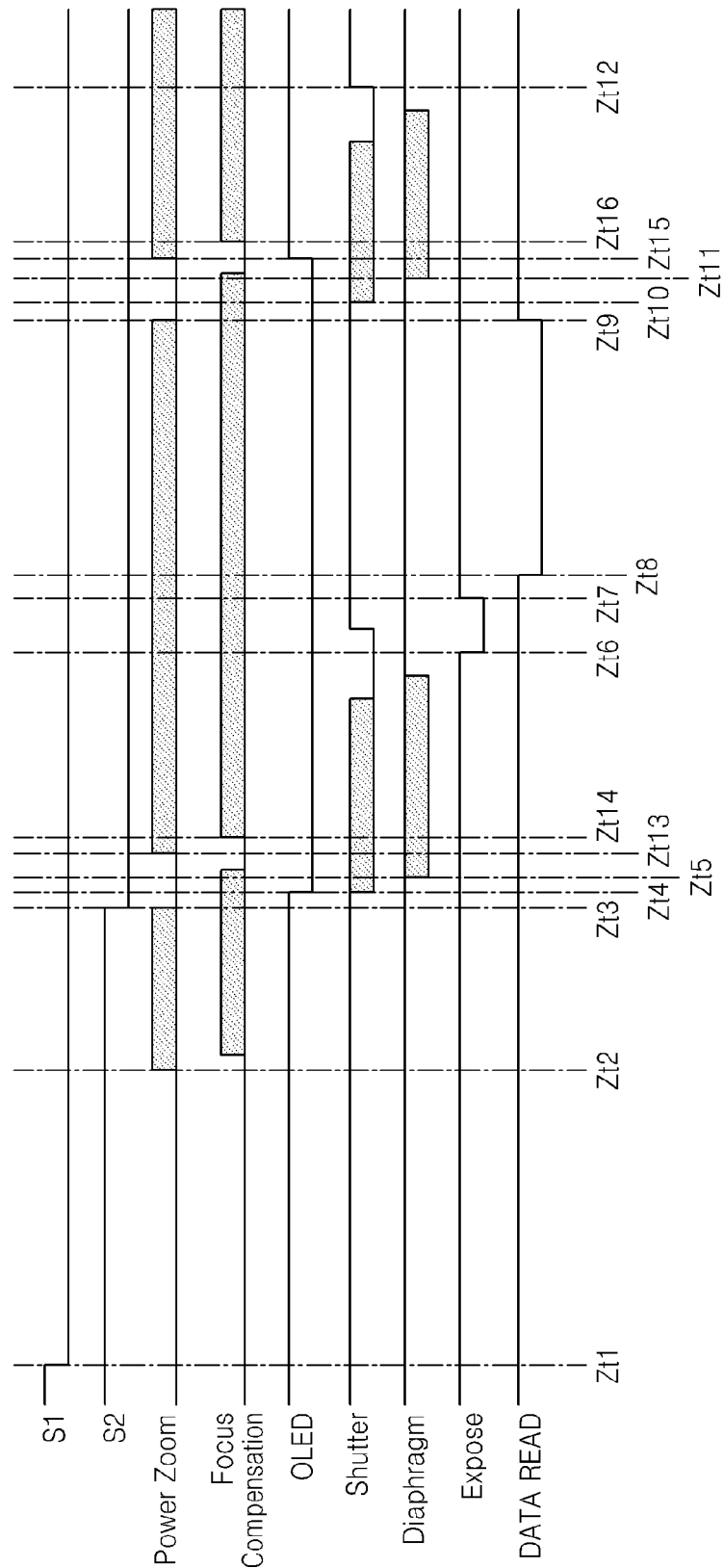
FIG. 6 is a timing diagram showing a method of performing a power zoom operation, according to an embodiment of the present invention.

FIG. 6 is a timing diagram showing a method of performing a power zoom operation, according to an embodiment of the present invention.

Referring to FIG. 6, a power zoom operation is not performed when the shutter 203 starts to be driven because power consumption of the power zoom operation is large. FIG. 6 will now be described based on the differences between FIGS. 5 and 6. When S2 is applied according to manipulation by a user at a time Zt3, the power zoom operation is stopped. The power zoom operation is stopped at the same time when S2 is applied, but the focus lens 105 is continuously driven until a varifocal compensation operation is completed to accurately perform the varifocal compensation operation at a location where the zoom lens 102 is stopped.

After stopping the power zoom operation, a release operation starts. A shutter closing operation for closing the shutter 203 starts at a time Zt4, and the iris 108 starts to be driven at a time Zt5 after a predetermined time, for example 15 ms, has passed after the time Zt4.

The power zoom operation starts again to be driven at a time Zt13 after a predetermined time, for example, after 15 ms, has passed after the iris 108 starts to be driven. The focus lens 105 starts to be driven at a time Zt14 to perform the varifocal compensation operation after a predetermined time, for example, after 15 ms, has passed after starting the power zoom operation.

Operations from a time Zt6 to a time Zt9 in FIG. 6 are identical to those in FIG. 5.

When reading data is completed at the time Zt9, the power zoom operation is stopped at the time Zt9 to drive the shutter 203. After the power zoom operation is stopped, a shutter opening operation and driving of the iris 108 are sequentially performed at times Zt10 and Zt11.

The power zoom operation starts again to be performed at a time Zt15 after a predetermined time, for example, after 15 ms, has passed after the iris 108 starts to be driven, and then the focus lens 105 starts to be driven at a time Zt16 to perform the varifocla compensation operation.

Figure 7:
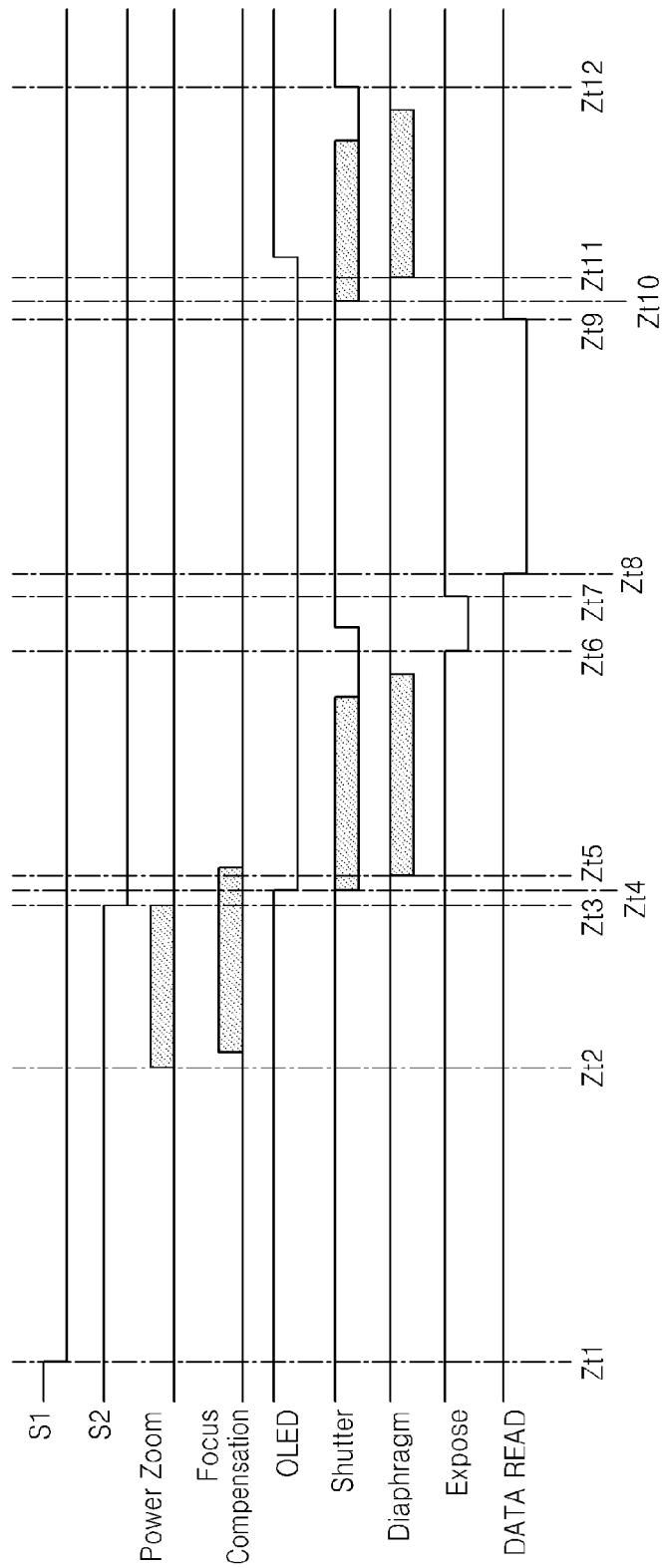
FIG. 7 is a timing diagram showing a method of performing a power zoom operation, according to another embodiment of the present invention.

FIG. 7 is a timing diagram showing a method of performing a power zoom operation, according to another embodiment of the present invention.

Referring to FIG. 7, a power zoom operation is also not performed when the shutter 203 starts to be driven because power consumption of the power zoom operation is large.

FIG. 7 will now be described based on the differences between FIGS. 6 and 7. When S2 is applied according to manipulation by a user at a time Zt3, the power zoom operation is stopped. The power zoom operation is stopped at the same time when S2 is applied, but the focus lens 105 is continuously driven until a varifocal compensation operation is completed to accurately perform the varifocal compensation operation at a location where the zoom lens 102 is stopped.

After stopping the power zoom operation, a release operation starts. Since operations from a time Zt4 to a time Zt12 in FIG. 7 are identical to those in FIG. 6, details thereof will be omitted.

Meanwhile, in the current embodiment of the present invention, the power zoom operation is not performed when S2 is in a low level according to the manipulation by the user. Accordingly, unlike FIG. 6, once the power zoom operation is stopped, the power zoom operation does not start again.

As described above, according to the digital photographing apparatus 1, wherein the release operation is requested to be performed while performing the power zoom operation, stopping of the power zoom operation is determined according to power consumption of the power zoom operation, and thus the power zoom operation is stably controlled.

Figure 8:
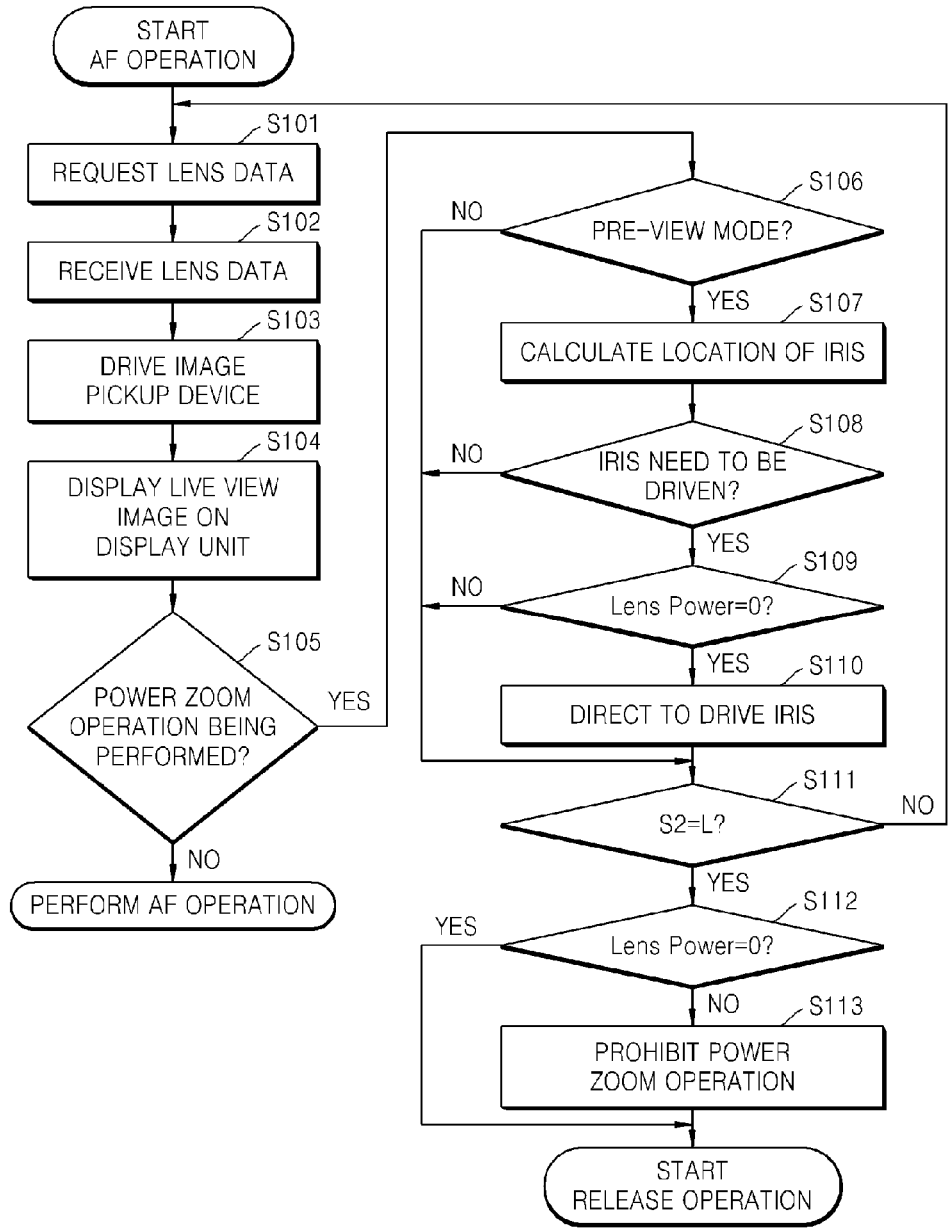
FIGS. 8 through 10 are flowcharts illustrating a method of controlling a body unit of a digital photographing apparatus, according to an embodiment of the present invention.
Figure 9:
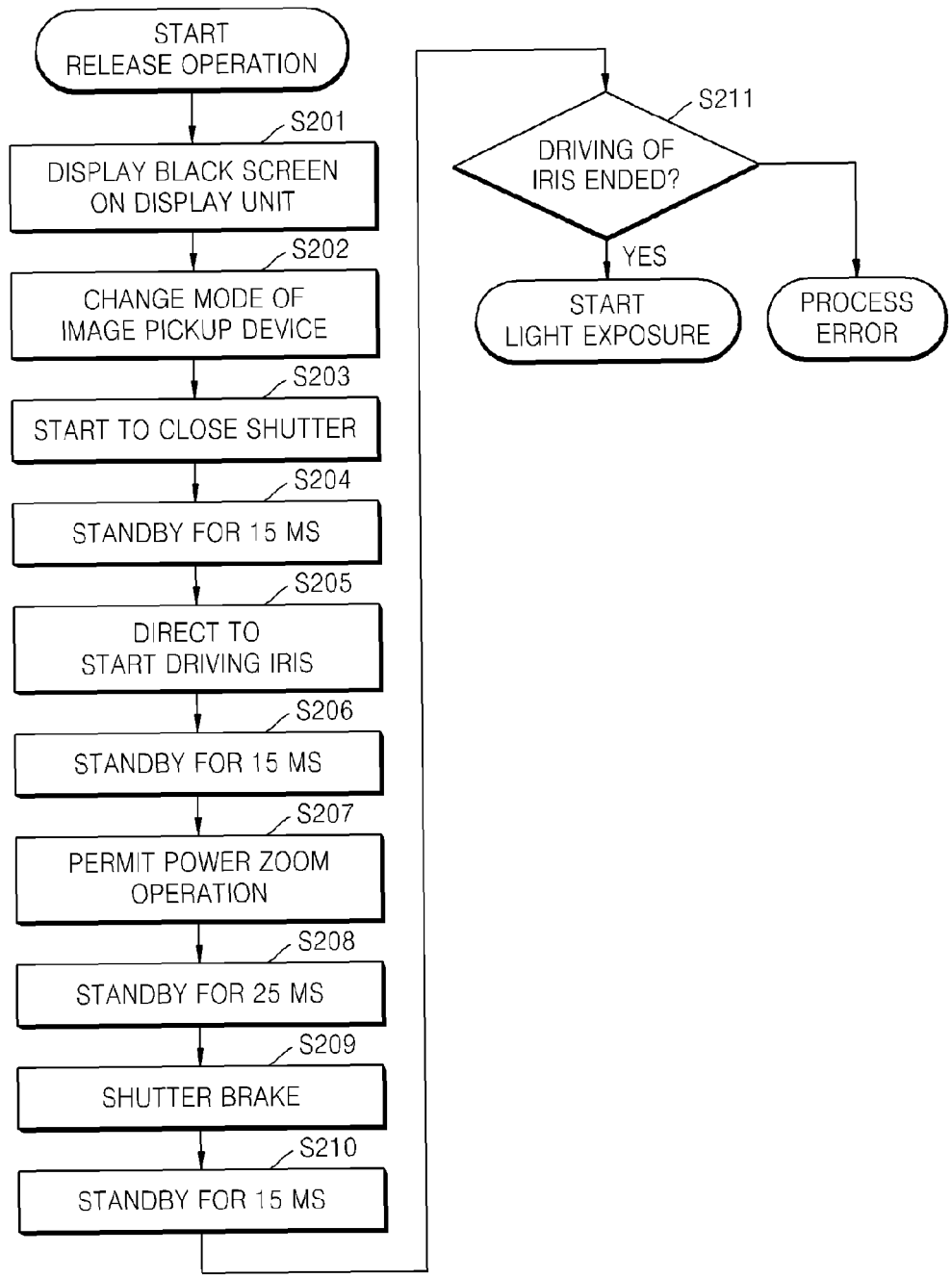
Figure 10:
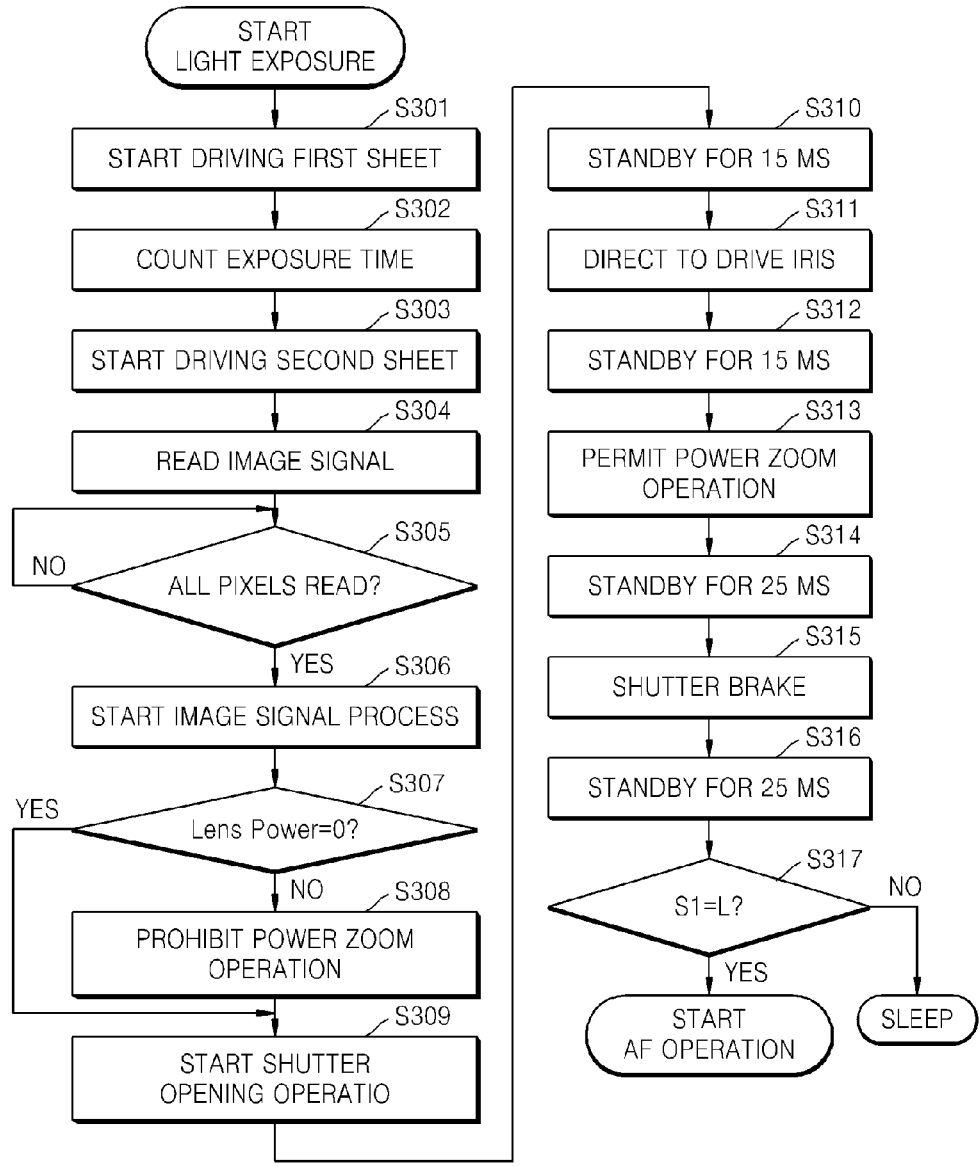

FIGS. 8 through 10 are flowcharts illustrating a method of controlling the body unit 200 of the digital photographing apparatus 1, according to an embodiment of the present invention. FIG. 11 contains tables showing lens data according to an embodiment of the present invention.

Referring to FIG. 8, the body unit 200 first requests the lens 100 to transmit lens data in operation S101, and receives the lens data by communicating with the lens 100 in operation S102. The lens data will now be described in detail with reference to FIG. 11.

Referring to FIG. 11, "Focus Speed" denotes data indicating a driving speed of an AF of the lens 100. For example, the driving speed may be in 10 stages from a lowest speed FS1 to a highest speed FS10. The driving speed may be indicated in a number of steps drivable in 1 second. Here, one step denotes a minimum unit of location control while performing the AF of the lens 100. In FIG. 11, the lens 100 is drivable at 2000 pulses per second (pps) at the lowest speed FS1 and at 6500 pps at the highest speed FS10. When directing the lens 100 to drive the focus lens 104, the body unit 200 may select an optimum driving speed based on "Focus Speed", and the lens 100 may drive the focus lens 105 at the selected driving speed.

"Focus Sensitivity" is a coefficient for converting a defocus constituting a lens defocus amount to a number of driving steps, and denotes sensitivity of a focus driving amount with respect to a lens driving amount. "Focus Sensitivity" includes data corresponding to focal lengths of the zoom lens 102. For example, at a focal length Z1, "Focus Sensitivity" is 0.32 pulse/micron, which means that the zoom lens is 102 driven by 0.32 pulse to drive defocus of 1 micron.

"Backlash" denotes a backlash amount generated when a driven direction of the focus lens 105 is reversed, and is shown in units of pulses. According to the current embodiment, for example, 30 pulses of backlash are generated.

"Actuator" denotes data indicating a type of driving actuator for AF. "Actuator" stores data about selecting one of a DC motor, a step motor, an ultrasonic wave motor, and a voice coil motor. A step motor is used in the current embodiment.

"Lens Power" denotes data indicating whether power consumption of an actuator of the lens 100 is equal to or above a base value. For example, the base value may be 2 A. When "Lens Power" is 0, the power consumption may be below or equal to the base value, and when "Lens Power" is 1, the power consumption may be above the base value.

"Open Iris" denotes data of an open F number (FNo) according to the focal lengths. Since the open F number changes according to a zooming operation of the zoom lens 102, "Open Iris" may include the open F number for each of the focal lengths.

"Focus Length" indicates focal length information at each focal length. According to the current embodiment, for example, the lens 100 may be 28 mm at a wide-end and 105.1 mm at a telephoto-end, wherein a focal length range is divided into 8.

The lens data described above is only an example, and may differ according to a type of the lens 100.

Meanwhile, although not illustrated in FIG. 7, the power zoom operation is permitted in the lens 100 before communicating with the lens 100.

Referring back to FIG. 8, after the body unit 200 obtains the lens data, the body unit 200 drives the image pickup device 204 in operation S103, and displays a live view image on the display unit 206 in operation S104.

Then, it is determined whether the power zoom manipulation is being performed in operation S105. The determination is performed by receiving information of the power zoom manipulation from the lens 100. If the power zoom operation is not performed, an AF operation is performed.

If the power zoom manipulation is being performed, it is determined whether a live view image is displayed by adjusting the iris 108 to a set iris value or by opening the iris 108 in operation S106. In other words, it is determined whether the digital photographing apparatus 1 is in a pre-view mode. Here, the pre-view mode is also applied when the user captures a moving image by using the set iris value.

In the pre-view mode, a location of the iris 108 from a current focal distance is calculated in operation S107. Even when a diameter of the iris 108 is mechanically the same, the zoom lens 102 may have a different effective F number according to a focal distance. Such a change of the F number is calculated from Open Iris received from the lens 100.

It is determined whether a current diameter of the iris 108 needs to be changed in operation S108, and if the iris 108 is needed to be driven, it is determined whether power consumption of the lens 100 is below or equal to 2 A as Lens Power is 0, in operation S109. If the power consumption is below or equal to 2 A, the power zoom operation and driving of the iris 108 may be simultaneously performed, and thus the lens 100 is directed to drive the iris 108 in operation S110.

Alternatively, since a maximum current supplied from the body unit 200 to the lens 100 is 2 A, when the power consumption exceeds 2 A, the iris 108 is not driven. Also, if the digital photographing apparatus 1 is not in the pre-view mode, the iris 108 is not driven.

Next, it is determined whether S2 is in a low level and a release operation is requested to start, in operation S111. If the release operation is not requested to start, operation S101 is performed. Alternatively, if the release operation is requested to start, it is determined whether Lens Power is 0 in operation S112. When Lens Power is 1, the power consumption of the lens 100 exceeds 2 A, and thus the driving of the power zoom operation is prohibited in operation S113, and the release operation starts. When Lens Power is 0, the release operation starts immediately.

Next, the method will be described with reference to FIG. 9.

Referring to FIG. 9, when the release operation starts, a black screen is displayed on the display unit 206, and it is displayed to the user that the release operation is being performed, in operation S201. When an OLED is used as the display unit 206, power consumption is almost proportional to display luminance since the OLED is a self-emission display device. Accordingly, by displaying a black screen, required power is reduced, thereby increasing power supplied to an actuator or the like during the release operation.

The image pickup device 204 is entered into a still image capture mode in operation S202, and the shutter 203 is changed from an open state to a closed state to display a live view image in operation S203. Since a DC motor is used as an actuator for driving the shutter 203, a high driving current is required to start driving the shutter 203. Accordingly, the body unit 200 stands by for a predetermined time, for example, about 15 ms, in operation S204 after the shutter 203 starts to be driven, and directs the lens 100 to drive the iris 108 in operation S205.

Also, in order to have enough driving current required for the power zoom operation, the power zoom operation is permitted in operation S207 after standing by for about 15 ms after the iris 108 starts to be driven. When the power zoom operation is prohibited in operation S113, the lens 100 starts to perform the power zoom operation in operation S207.

The shutter brake is put on the shutter 203 in operation S209, after standing by for about 25 ms in operation S208. Then, the body unit 200 stands by for a predetermined time, for example, about 15 ms, to end the driving of the iris 108 in operation S210, and then it is determined whether the driving of the iris 108 is ended respectively in operation S211.

When the driving of the iris 108 is not ended, it is determined that a mechanical error has been generated, and thus an error process is performed. When the driving of the iris 108 is normally ended, light exposure starts to be performed.

Next, the method will now be described with respect to FIG. 10.

Referring to FIG. 10, when the light exposure starts to be performed, a first sheet or a front sheet of the shutter 203 is driven in operation S301. Accordingly, an exposure time is counted in operation S302. When a predetermined exposure time has passed, a second sheet or a rear sheet is driven in operation S303.

After the first and second sheets are driven, an image signal is read in operation S304 by a CMOS image sensor constituting the image pickup device 204. When it is determined that operation S304 has been performed on all pixels in operation S305, an image signal process for accumulating an image as an image file is performed in operation S306.

Then, it is determined whether Lens Power is 0 in operation S307, and if Lens Power is not 0, performing of the power zoom operation is prohibited in operation S308. Then, an operation of opening the shutter 203 starts in operation S309 for a following photograph, and the digital photographing apparatus 1 stands by for about 15 ms in operation S310. After the stand by, the lens 100 is directed to start an operation of opening the iris 108 in operation S311, the digital photographing apparatus 1 stands by for about 15 ms in operation S312, and then permits the performing of the power zoom operation in operation S313.

After the performing of the power zoom operation is permitted, the digital photographing apparatus 1 stands by for about 25 ms in operation S314, and the shutter brake is put on the shutter 203 in operation S315 as the driving of the shutter 203 is completed. Then, the digital photographing apparatus 1 stands by for about 25 ms in operation S316.

Then, it is determined whether 51 is in a low level in operation S317. When S1 is in the low level, the AF operation starts again, and when S1 is in a high level, the digital photographing apparatus 1 is not being manipulated, and thus is in a sleep state.

As such, the power zoom operation and the driving of the shutter 203 and iris 108 are performed by the body unit 200. Operations of the lens 100 will now be described in detail.

FIGS. 12A through 15 are flowcharts illustrating a method of controlling the lens 100 of the digital photographing apparatus 1, according to an embodiment of the present invention.

Figure 12A:
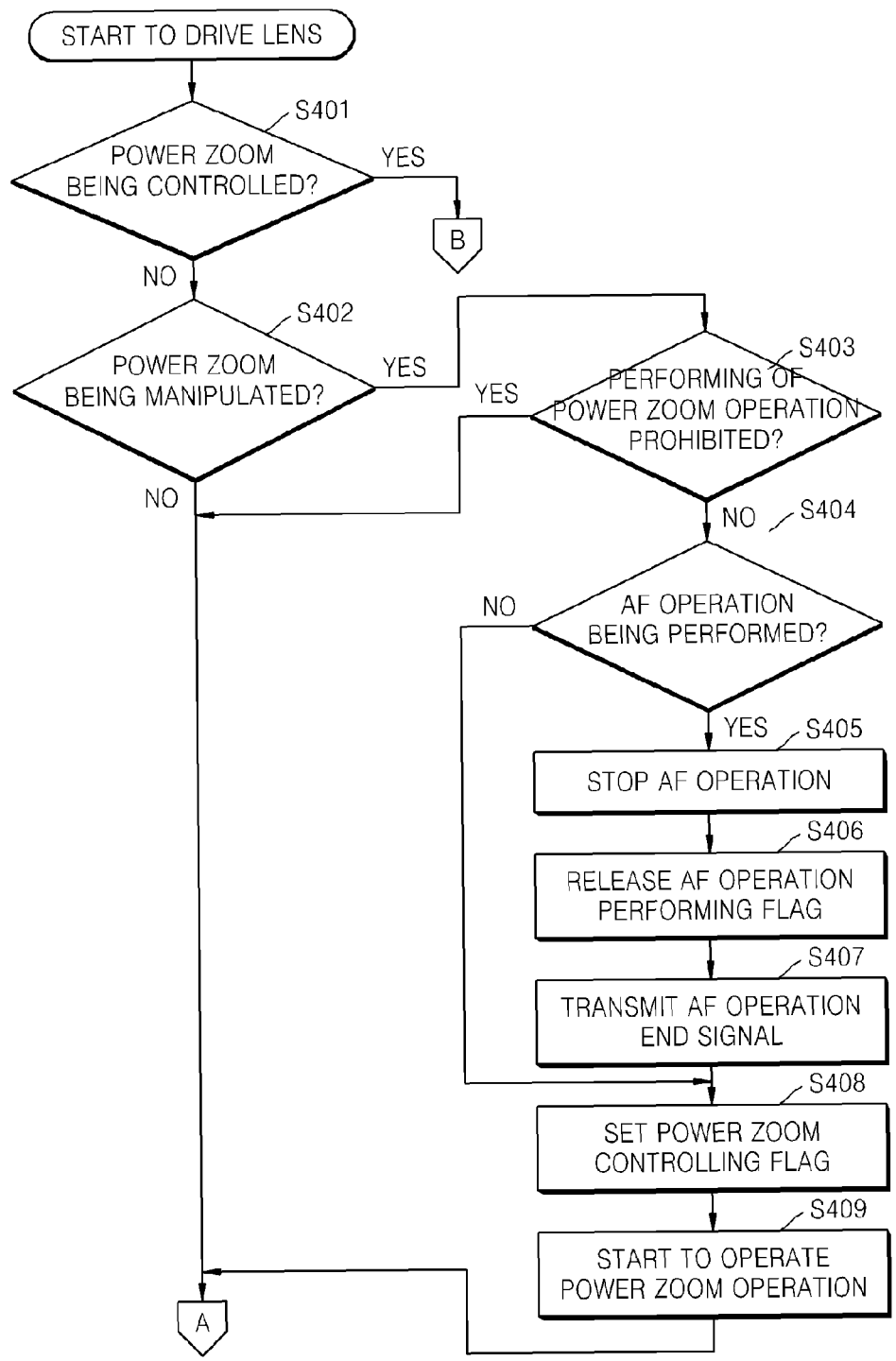
FIGS. 12A through 15 are flowcharts illustrating a method of controlling a lens of a digital photographing apparatus, according to an embodiment of the present invention.
Figure 12B:
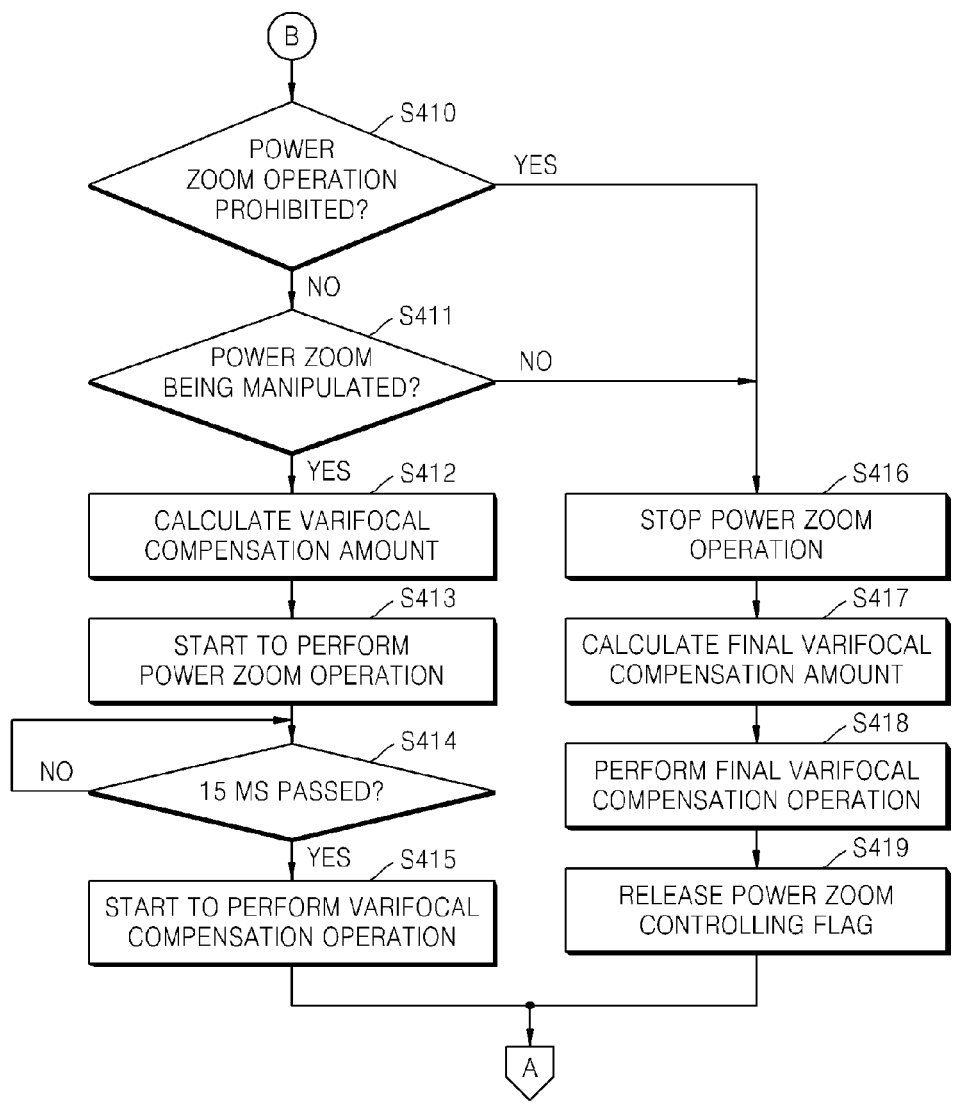

Referring to FIGS. 12A and 12B, when the lens 100 starts to be driven, it is determined first whether power zoom is being controlled in operation S401. If a power zoom operation is not performed, it is determined whether the power zoom is being manipulated in operation S402.

If the power zoom is being manipulated, it is determined whether performing of the power zoom operation is prohibited by the body unit 200 in operation S403. If the performing of the power zoom operation is not prohibited, it is determined whether an AF operation is being currently performed in operation S404.

If the AF operation is not being performed, a power zoom controlling flag is set in operation S408. Then, the power zoom operation starts to be performed in operation S409. Here, the body unit 200 performs the AF operation.

Alternatively, if the power zoom is manipulated while performing the AF operation, the power zoom is first performed. Accordingly, if it is determined that the AF operation is being performed in operation S404, the AF operation is stopped in operation S405, and an AF operation performing flag is released in operation S406. Then, an AF operation end signal is transmitted to the body unit 200 in operation S407. After the AF operation end signal is transmitted, the power zoom controlling flag is set in operation S408. Then, the power zoom operation starts to be performed in operation S409.

Figure 13:
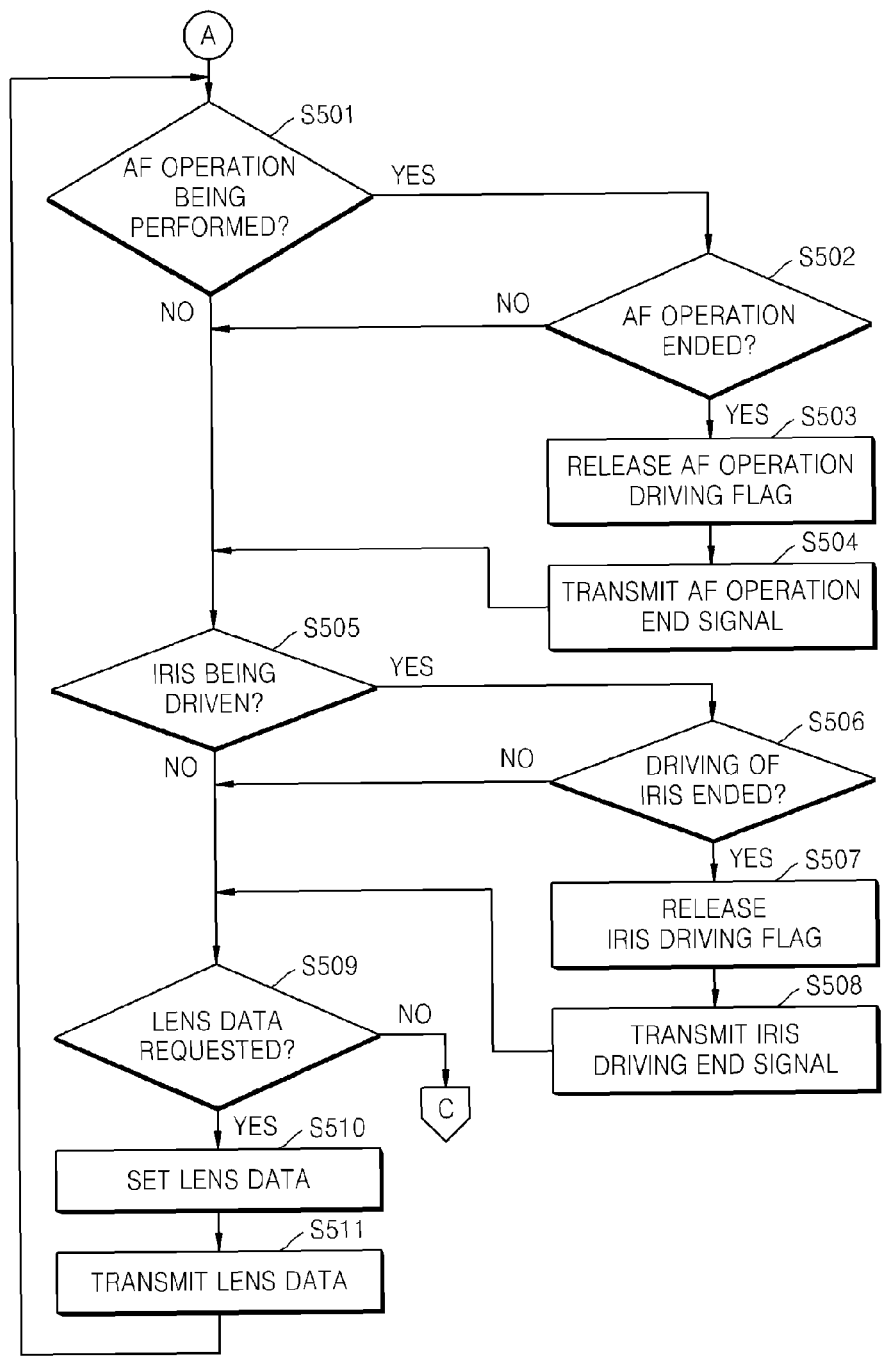

If it is determined that the power zoom is not manipulated in operation S402 or that the performing of the power zoom operation is prohibited in operation S403, operation S501 of FIG. 13 is performed.

Meanwhile, if it is determined that the power zoom is being controlled in operation S401, it is determined whether the performing of the power zoom operation is prohibited in operation S410. If the performing of the power zoom operation is not prohibited, it is determined whether the power zoom is being currently manipulated in operation S411.

If the power zoom is being manipulated, the power zoom operation is continuously performed. Also, a varifocal compensation amount is calculated in operation S412, and the power zoom operation starts to be performed in operation S413. The digital photographing apparatus stands by about 15 ms in operation S414 after the power zoom operation starts to be operated, and after about 15 ms, a varifocal compensation operation starts to be performed in operation S415. The varifocal compensation operation does not start before about 15 ms has passed, thereby differentiating a point of time when the zoom lens 102 starts to be driven and a point of time when the focus lens 105 starts to be driven. Accordingly, a driving current is not repeatedly generated.

Meanwhile, if it is determined that the performing of the power zoom operation is prohibited in operation S410 or that the power zoom is not manipulated in operation S411, the power zoom operation is stopped in operation S416. Also, a final varifocal compensation amount is calculated in operation S417 at a location where the zoom lens 102 is stopped, and the focus lens 105 is driven to perform a final varifocal compensation operation in operation S418. The power zoom controlling flag is released in operation S419.

The method will now be described with respect to FIG. 13.

Referring to FIG. 13, when the lens 100 starts to be driven, it is determined whether the AF operation is being performed in operation S501. When the AF operation is being performed, it is determined whether the AF operation is ended in operation S502. When the AF operation is ended, an AF operation driving flag is released in operation S503, and an AF operation end signal is transmitted to the body unit 200 in operation S504.

When the AF operation is not being performed or the AF operation is ended, it is determined whether the iris 108 is being driven in operation S505. If the iris 108 is being driven, it is determined whether the driving of the iris 108 is ended in operation S506. If the driving of the iris 108 is ended, an iris driving flag is released in operation S507, and an iris driving end signal is transmitted to the body unit 200 in operation S508.

If the iris 108 is not being driven or the driving of the iris 10 is ended, it is determined whether the body unit 200 requested to transmit lens data in operation S509. If the lens data is requested, the lens data is set in operation S510, the set lens data is transmitted to the body unit 200 in operation S511, and then operations 501 through S510 are performed again.

The method will now be described with reference to FIG. 14.

Figure 14:
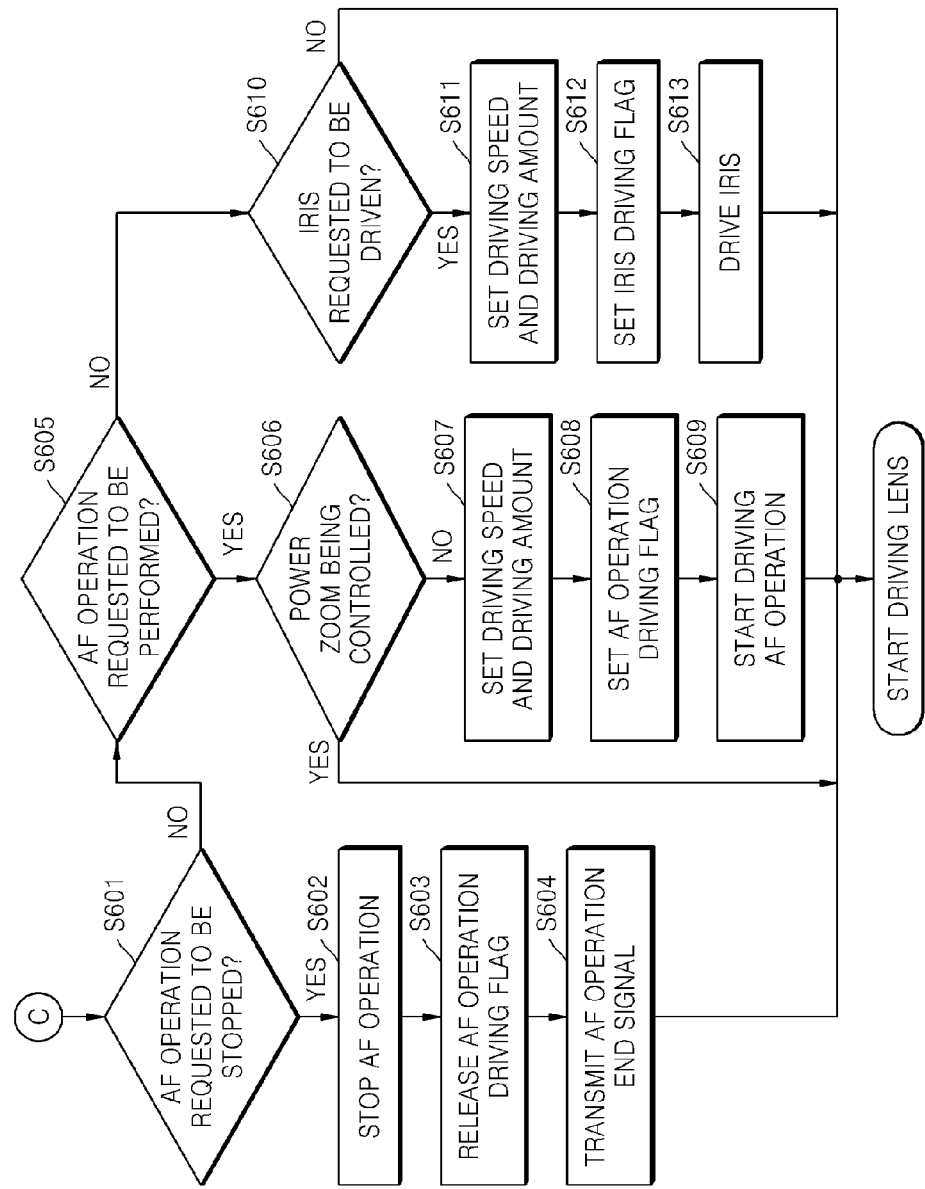

Referring to FIG. 14, if the body unit 200 did not request to transmit the lens data, it is determined whether the AF operation is requested to be stopped in operation S601. If the AF operation is requested to be stopped, the driving of the focus lens 105 is immediately stopped in operation S602, and a focus lens driving flag is released in operation S603. Then, an AF operation end signal is transmitted to the body unit 200 in operation S604.

Meanwhile, if the AF operation is not requested to be stopped, it is determined whether the AF operation is requested to be performed in operation S605. If the AF operation is requested to be performed, it is determined whether a power zoom is being controlled in operation S606. If the power zoom is not being controlled, a driving speed and a driving amount of the AF operation are set in operation S607 according to a direction of the body unit 200, and an AF operation driving flag is set in operation S608. Then, the AF operation starts to be driven in operation S609. Although not shown in FIG. 14, the performing of the AF operation may be performed by a step motor, and the driving speed and the driving amount may be set in a driver integrated circuit (IC) to automatically perform the AF operation.

Alternatively, if the AF operation is not requested to be performed in operation S605, it is determined whether the iris 108 is requested to be driven in operation S610. If the iris 108 is requested to be driven, a driving speed and a driving amount of the iris 108 are set in operation S611 according to the direction of the body unit 200, and an iris driving flag is set in operation S612. Then, the iris 108 is driven in operation S613. If the iris 108 is not requested to be driven in operation S610, the lens 100 starts to be driven to control a following loop.

The method of FIG. 15 will now be described.

Figure 15:
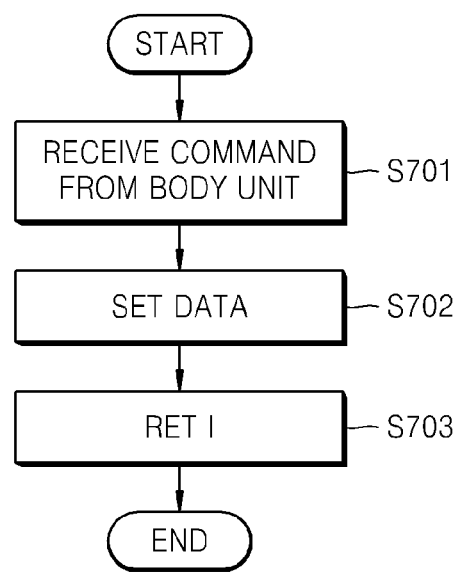

FIG. 15 shows a case when data is received from the body unit 200. An interrupt process is performed on the data from the body unit 200 according to an update request from the body unit 200.

Upon receiving a command from the body unit 200 in operation S701, the data is set according to the received command via the interrupt process in operation S702. After the data is set, the lens 100 returns from an interrupt process loop (returns from an interrupt routine (RETI)), in operation S703.

As such, the lens 100 performs the power zoom operation and drives the shutter 203 and iris 108, according to the current embodiment of the present invention.

As described above, according to the digital photographing apparatus 1, when the release operation is requested to start while performing the power zoom operation, stopping of the power zoom operation is determined according to power consumption of the power zoom operation to stably control the power zoom operation.

Figure 16:
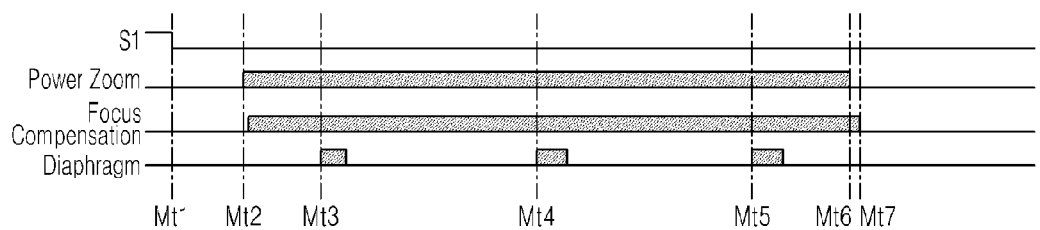
FIG. 16 is a timing diagram showing a method of performing a general power zoom operation.

FIG. 16 is a timing diagram showing a method of performing a general power zoom operation. In FIG. 16, a power zoom operation is performed and the iris 108 is controlled while the digital photographing apparatus 1 performs an operation other than a release operation, wherein power consumption of the power zoom operation is low.

Referring to FIG. 16, S1 is applied at a time Mt1 according to manipulation by a user, and then a power zoom ring is manipulated by the user to start the power zoom operation at a time Mt2. When the power zoom operation starts, a varifocal compensation operation starts to be performed to compensate for a change of a focus location according to a movement of the zoom lens 102.

Then, the iris 108 starts to be driven to compensate for an effective F number of the lens 100 at times Mt3 through Mt5, with respect to the change of the focal distance according to the power zoom operation.

When the user stops to manipulate the power zoom, the power zoom operation stops at a time Mt6, and a final varifocal compensation operation corresponding to a location where the zoom lens 102 is stopped is performed at a time Mt7.

Figure 17:
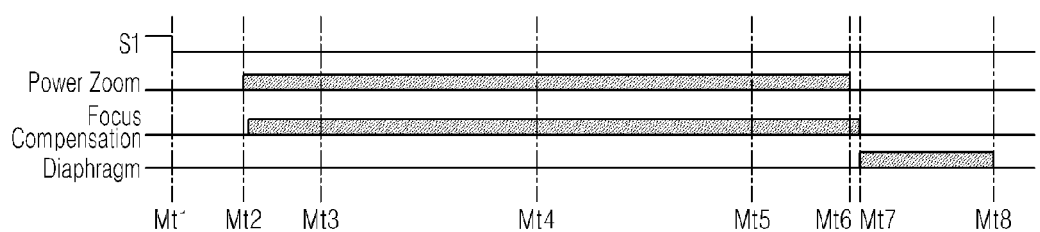
FIG. 17 is a timing diagram showing a method of performing a power zoom operation, according to another embodiment of the present invention.

FIG. 17 is a timing diagram showing a method of performing a power zoom operation, according to another embodiment of the present invention. In FIG. 17, power consumption of the power zoom operation is large.

Referring to FIG. 17, 51 is applied at a time Mt1 according to manipulation by a user, and then a power zoom ring is manipulated by the user to start the power zoom operation at a time Mt2 like FIG. 16. When the power zoom operation starts, a varifocal compensation operation starts to be performed to compensate for a change of a focus location according to a movement of the zoom lens 102.

A focal distance changes according to the power zoom operation, and thus an effective F number of the lens 100 changes. According to the current embodiment, the iris 108 is not immediately driven after the power zoom operation starts.

When the user stops to manipulate the power zoom, the operation zoom operation is stopped at a time Mt6, and a final varifocal compensation operation corresponding to a location where the zoom lens 102 is stopped is performed at a time Mt7.

In the current embodiment, the iris 108 is driven to compensate for the change of the effective F number after the final varifocal compensation operation is completed at times Mt7 to Mt8.

Figure 18:
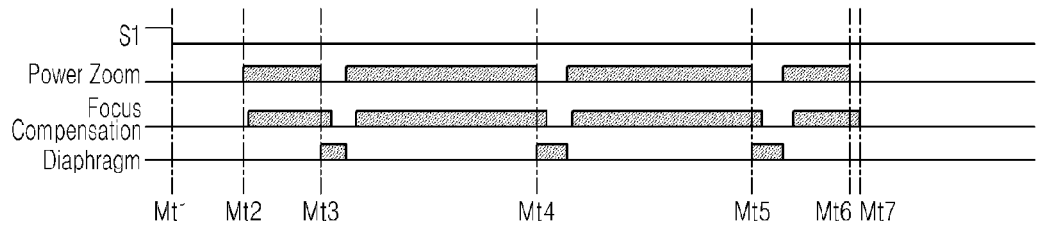
FIG. 18 is a timing diagram showing a method of performing a power zoom operation, according to another embodiment of the present invention.

FIG. 18 is a timing diagram showing a method of performing a power zoom operation, according to another embodiment of the present invention. In FIG. 18, power consumption of the power zoom operation is large.

Referring to FIG. 18, S1 is applied at a time Mt1 according to manipulation by a user, and then a power zoom ring is manipulated by the user to start the power zoom operation at a time Mt2 like FIG. 16. When the power zoom operation starts, a varifocal compensation operation starts to be performed to compensate for a change of a focus location according to a movement of the zoom lens 102.

In the current embodiment, compensation corresponding to a change of an effective F number of the lens 100 according to the power zoom operation is performed during the power zoom operation, and the power zoom operation is prohibited while the effective F number is being changed. Accordingly, the power zoom operation is stopped at times Mt3 through Mt5 while the iris 108 starts to be driven.

After the power zoom operation is stopped, the iris 108 starts to be driven, thereby changing the effective F number. When the compensating for the effective F number is completed, the power zoom operation is performed again.

When the user stops to manipulate the power zoom, the operation zoom operation is stopped at a time Mt6, and a final varifocal compensation operation corresponding to a location where the zoom lens 102 is stopped is performed at a time Mt7.

As described above, the digital photographing apparatus 1 according to the embodiments of the present invention can stably control the power zoom operation by determining stopping of the power zoom operation according to the power consumption of the power zoom operation if the iris 108 is requested to be driven while performing the power zoom operation.

While describing the embodiments of the present invention, the values of driving time and driving amount are only examples, and may vary. The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A digital photographing apparatus comprising a body unit and an exchangeable lens installed to the body unit, wherein:
    the exchangeable lens comprises:
    a power zoom performer for performing a power zoom operation; and
    an iris for adjusting an amount light penetrating through an imaging lens;
    the body unit comprises:
    an image pickup device for generating an image signal by capturing the light;
    a shutter for controlling light exposure of the image pickup device; and
    a release controller for controlling operations of the shutter and the iris;
    the power zoom operation is prohibited for a predetermined time beginning when the release controller starts to drive the shutter or the iris and the power zoom operation ceases to be prohibited before an end of a time for which the shutter or the iris is driven; and
    after the power zoom operation ceases to be prohibited, the power zoom is permitted to operate while the shutter or the iris is being driven.

2. The digital photographing apparatus of claim 1, wherein:
    the exchangeable lens further comprises a compensator for performing varifocal compensation to compensate for a focal length change according to the power zoom operation; and
    the compensator is configured to perform the varifocal compensation even when the performing of the power zoom operation is prohibited by the release controller.

3. The digital photographing apparatus of claim 1, wherein:
    the exchangeable lens further comprises:
    a lens storage unit for storing information indicating actual power consumption; and
    a communicator for transmitting the information indicating actual power consumption to the body unit; and
    the release controller is configured to prohibit the performing of the power zoom operation if the actual power consumption is equal to or above a reference value.

4. The digital photographing apparatus of claim 1, wherein:
    the exchangeable lens further comprises:
    a lens storage unit for storing information indicating actual power consumption; and
    a communicator for transmitting the information indicating actual power consumption to the body unit; and
    the release controller is configured not to prohibit the performing of the power zoom operation if the actual power consumption is below a reference value.

5. The digital photographing apparatus of claim 1, wherein the power zoom performer is configured to stop the power zoom operation if the release controller starts to drive the shutter or the iris while the power zoom performer is performing the power zoom operation.

6. The digital photographing apparatus of claim 5, wherein:
    the exchangeable lens further comprises a compensator for performing varifocal compensation to compensate for a focal length change according to the power zoom operation; and
    the compensator is configured to stop an operation after performing the varifocal compensation until a point of time when the power zoom operation is stopped when the performing of the power zoom operation is prohibited by the release controller.

7. The digital photographing apparatus of claim 1, wherein the driving of the shutter comprises at least one of shutting the shutter and opening the shutter.

8. A method of controlling a digital photographing apparatus for performing a power zoom operation according to manipulation by a user, the method comprising prohibiting the power zoom operation for a predetermined time beginning when a shutter or an iris starts to be driven, ceasing to prohibit the power zoom operation before an end of a time for which the shutter or the iris is driven, and after the power zoom operation ceases to be prohibited, permitting the power zoom to operate while the shutter or the iris is being driven.

9. The method of claim 8, wherein the digital photographing apparatus performs varifocal compensation to compensate for a focal length change according to the power zoom operation, and performs the varifocal compensation even when the performing of the power zoom operation is prohibited.

10. The method of claim 8, wherein:
the digital photographing apparatus comprises an exchangeable lens and a body unit installed with the exchangeable lens; and
the exchangeable lens transmits information indicating actual power consumption to the body unit and the body unit prohibits the performing of the power zoom operation if the power consumption is equal to or above a reference value.

11. The method of claim 8, wherein:
the digital photographing apparatus comprises an exchangeable lens and a body unit installed with the exchangeable lens; and
wherein the exchangeable lens transmits information indicating actual power consumption to the body unit and the body unit does not prohibit the performing of the power zoom operation if the power consumption is below a reference value.

12. The method of claim 8, wherein the power zoom operation is stopped if the shutter or the iris starts to be driven while the power zoom performer is performing the power zoom operation.

13. The method of claim 12, wherein the digital photographing apparatus performs varifocal compensation to compensate for a focal length change according to the power zoom operation, and stops an operation after performing the varifocal compensation until a point of time when the power zoom operation is stopped when the performing of the power zoom operation is prohibited.

14. The method of claim 8, wherein the driving of the shutter comprises at least one of shutting the shutter and opening the shutter.

* * * * *